United States Patent [19]

Ko

[11] Patent Number: 4,759,098
[45] Date of Patent: Jul. 26, 1988

[54] DIRECTION SETTING DEVICE FOR ROLLERS OF A BABY WALKER

[75] Inventor: Ping-Shien Ko, Tainan Hsien, Taiwan

[73] Assignee: Hong-Fu Zun, Taiwan

[21] Appl. No.: 931,741

[22] Filed: Nov. 17, 1986

[51] Int. Cl.$^4$ .................. B60B 33/00; B62B 7/02; B62B 9/08

[52] U.S. Cl. .................. 16/29; 16/35 R; 16/47; 280/47.38; 280/658

[58] Field of Search .............. 16/29, 35 D, 35 R, 47, 16/48; 280/47.11, 47.38, 644, 658

[56] References Cited

U.S. PATENT DOCUMENTS

| | | | |
|---|---|---|---|
| 4,037,291 | 7/1977 | Huempfner et al. | 16/35 D |
| 4,184,227 | 1/1980 | Propst et al. | 16/35 R |
| 4,349,938 | 9/1982 | Fontana | 16/35 R |
| 4,570,288 | 2/1986 | Kassai | 16/35 R |

FOREIGN PATENT DOCUMENTS

| | | | |
|---|---|---|---|
| 3145758 | 5/1983 | Fed. Rep. of Germany | 16/35 R |
| 3212994 | 10/1983 | Fed. Rep. of Germany | 16/35 R |
| 3219519 | 12/1983 | Fed. Rep. of Germany | 16/35 R |

*Primary Examiner*—Nicholas P. Godici
*Assistant Examiner*—Edward A. Brown
*Attorney, Agent, or Firm*—McGlew and Tuttle

[57] ABSTRACT

A direction setting device for rollers of a baby walker includes a pair of upper connectors, a pair of lower connectors rotatably connected to the upper connectors, and a control mechanism for permitting or preventing the relative rotation between the upper connectors and the lower connectors. The upper and lower connectors are utilized to connect the seat to the front rollers on the baby walker. Each of the upper connectors includes a spring biased key member. Each of the lower connectors includes a circumferential contacting surface capable of engagement with the key member and a key way in the contacting surface capable of engagement with the key member to prevent the relative rotation between the upper and lower connectors. The control mechanism is capable of urging the key members against the bias action of the springs so that the key members move away from the contacting surfaces of the lower connectors, and is capable of releasing the key members to abut on the contacting surfaces of the lower connectors. Upon the engagement of the key member in the key way, the rollers move unidirectionally.

1 Claim, 4 Drawing Sheets 4,759,098

DIRECTION SETTING DEVICE FOR ROLLERS OF A BABY WALKER

BACKGROUND OF THE INVENTION

The invention relates to a baby walker, particularly to a direction setting device for rollers of a baby walker, which is set easily.

Conventionally, when a baby walker is necessary to be moved only forwardly, two front rollers must be firstly rotated to face forwardly, then, a direction setting device is adjusted to prevent the rollers from rotating relative to the seat of the baby walker. This forward direction of the front rollers may be effected by hand or foot. It is desirable to simplify or save this work, because this work is not only troublesome, but also smuts the hand.

SUMMARY OF THE INVENTION

It is therefore an object of the invention to provide a direction setting device for rollers of a baby walker which is set easily.

According to the invention, a direction setting device includes a pair of upper connectors, adapted to be connected to a seat of the baby walker, each of the uppper connectors including a rotating shaft secured thereon and a spring biased key member mounted on the upper connector; a pair of lower connectors, respectively adapted to be connected to a front roller of the baby walker, each of the lower connectors including a circular sleeve secured thereon for mounting roatably the rotating shaft of the corresponding upper connector thereon, the circular sleeve including a circumferential contacting surface for being abutted thereon by the key member, and a key way in the circumferential contacting surface so as to receive the key member of the corresponding upper connector to prevent the lower connector from rotation relative to the upper connector; and a control mechanism for urging the key members against the bias action of the springs to a first position where the key members are spaced from the circumferential contacting surfaces and for releasing the key members to abut on the circumferential contacting surfaces in a second position; whereby, the control mechanism is in the first position, the lower connectors can rotate relative to the upper connectors so that the front rollers can move in any direction; and when the control mechanism is in the second position, the key members will slip into the key ways to hinder said lower connectors from rotation relative to the upper connectors so that the front rollers can move unidirectionally.

DETAILED DESCRIPTION OF THE PREFERRED EMBODIMENT

Figure 1:
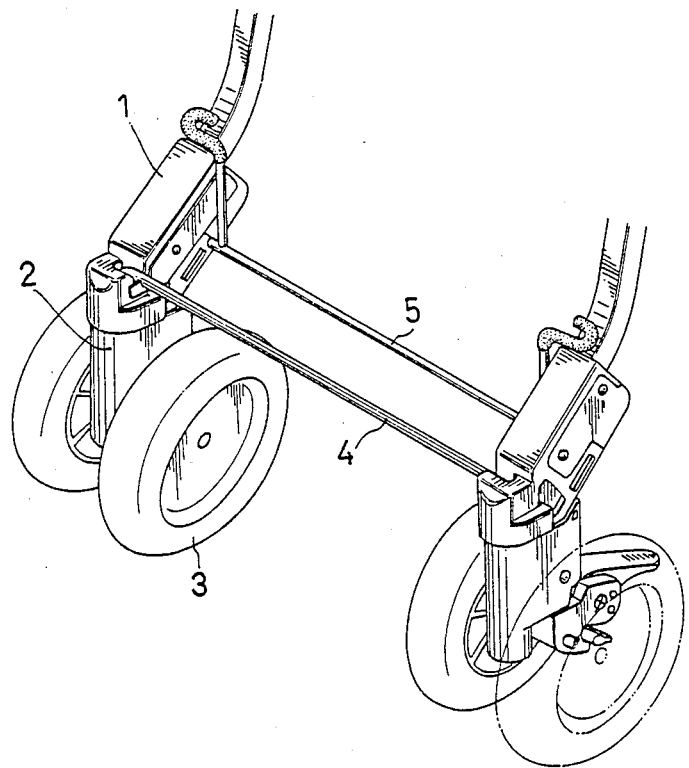
FIG. 1 is a perspective view of a direction setting device for rollers of a baby walker according to the invention.

Referring to FIG. 1, a direction setting device includes a pair of upper connectors 1 adapted to be connected to a seat of a baby walker, a pair of lower connectors 2 respectively adapted to be connected to a front roller 3 of the baby walker, a connecting rod 4 for interconnecting the upper connectors 1, and an actuator member 5 for controlling the unidirectional movement of the front rollers 3.

Figures 2, 3:
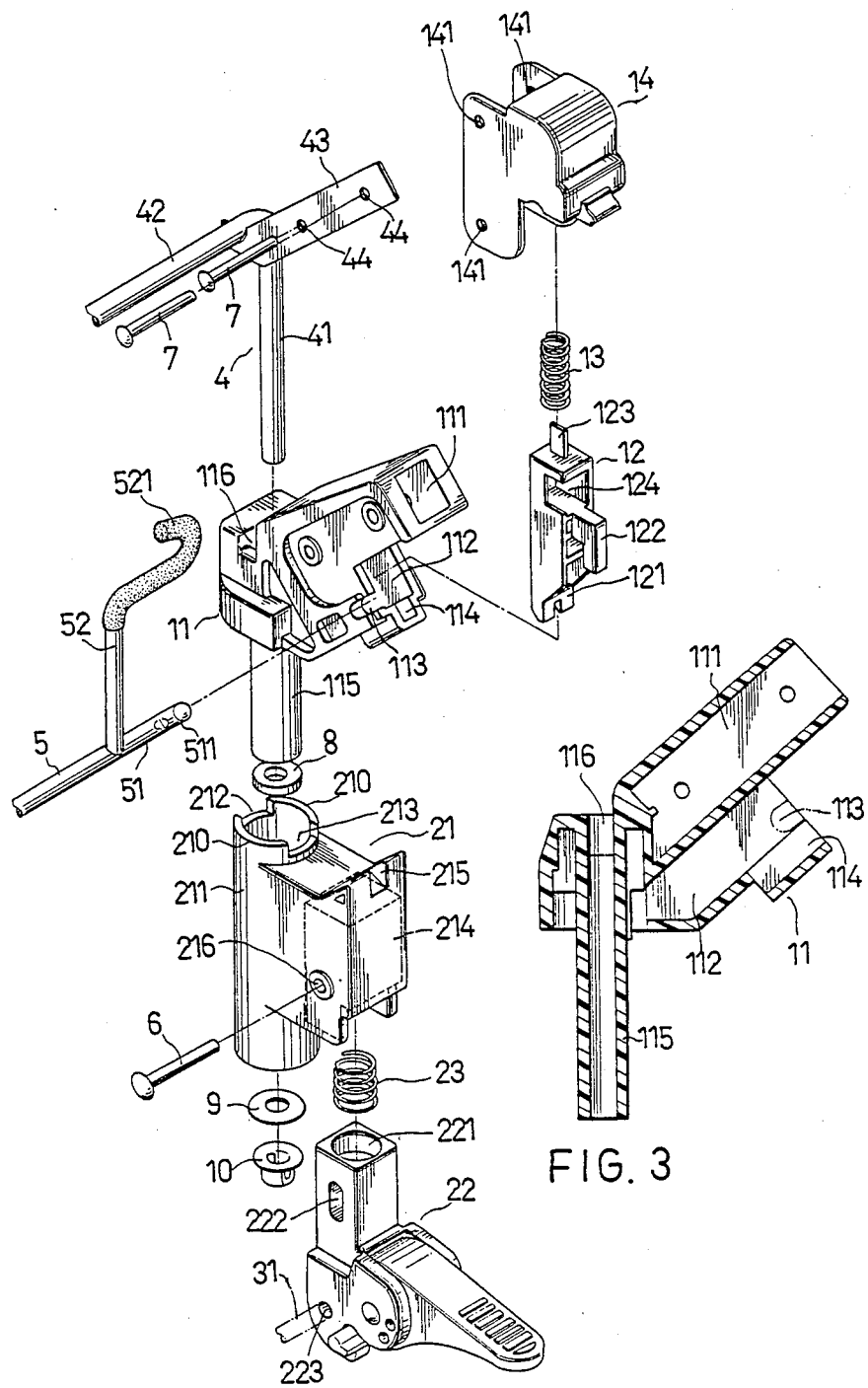
FIG. 2 is an exploded view of the direction setting device of FIG. 1.
FIG. 3 is a sectional view showing an upper connector body of the direction setting device of FIG. 2.

Referring to FIG. 2, the upper connector includes an upper connector body 11, with reference to FIG. 3, including an upper cavity 111 adapted to be connected to a seat of a baby walker, an ends-opened upper channel 112 with a curved lower notch 113 provided at the right opening of the upper channel 112, an ends-opened lower channel 114 provided below the upper channel 112, a hollow rotating shaft 115 at the front of the upper connector body 11, and a cross groove 116 provided in the upper surface of the upper connector body 11 and communicated wih the bore of the hollow rotating shaft 115; a key member 12, received in the upper and lower channels 112, 114, including a forked main engaging head 121 at the front end thereof, an auxiliary engaging limb 122 at an intermediate portion of the key member 12, a tail 123, and a rectangular recess 124 opened in a lower and left surfaces of the key member 12; a first compression spring 13 sleeved on the tail 123 of the key member 12; and a cover 14 having two pairs of opposed first circular holes 141 for covering the upper and lower channels 112, 114.

The lower connector 2 includes a lower connector body 21, including a circular front sleeve 211 having a front main key way 212 at the upper end thereof and an intermediate main key way 213 at the upper end of the sleeve 211 opposite the front main key way 212 to define two spaced-apart contacting surfaces 210, a rectangular rear sleeve 214 integral with the circular front sleeve 211, a rear auxiliary key way 215 at the upper end of the rectangular rear sleeve 214, and a pair of opposed second circular holes 216 provided through the side walls of the rectangular rear sleeve 214; a roller support 22, including a cylindrical recess 211 in the upper surface of the longitudinal portion of the roller support 22, a pair of opposed slide slots 222 at the center of the longitudinal portion of the roller support 22 for connecting said lower connector body 21 by a first rivet 6, and a pair of third circular holes 223 between the longitudinal portion and the horizontal portion of the roller support 22 for rotatably mounting the axle 31 of the roller 3; and a second compression spring 23 received in the cylindrical recess 221 of the roller support 22 and in the rectangular sleeve 214 of the lower connector body 21 for cushioning against the seat of the baby walker.

The connecting rod 4 for interconnecting the upper connectors 1 is of inverted U-shape. The longitudinal portions 41 of the connecting rod 4 are respectively inserted into the bore of the hollow rotating shaft 115. The horizontal portion 42 of the connecting rod 4 is received in the cross groove 116 of the upper connector body 11 at the opposite ends thereof. Between the longitudinal portion 41 and each of the horizontal portions 42 of the connecting rod 4 is provided an inclined lug 43 having a pair of fourth circular holes 44 for connecting the cover 14 by a pair of second rivets 7.

At two ends of the actuator member 5 are respectively forked a lower push rod 51 and an upper control portion 52. The push rod 51 has an oblique L-shaped free end 511 for being inserted into the rectangular recess 124 of the key member 12 through the curved notch 113 so as to drive the key member 12 to move. The control portion 52 has a recurved free end 521 for being actuated conveniently.

Figure 5:
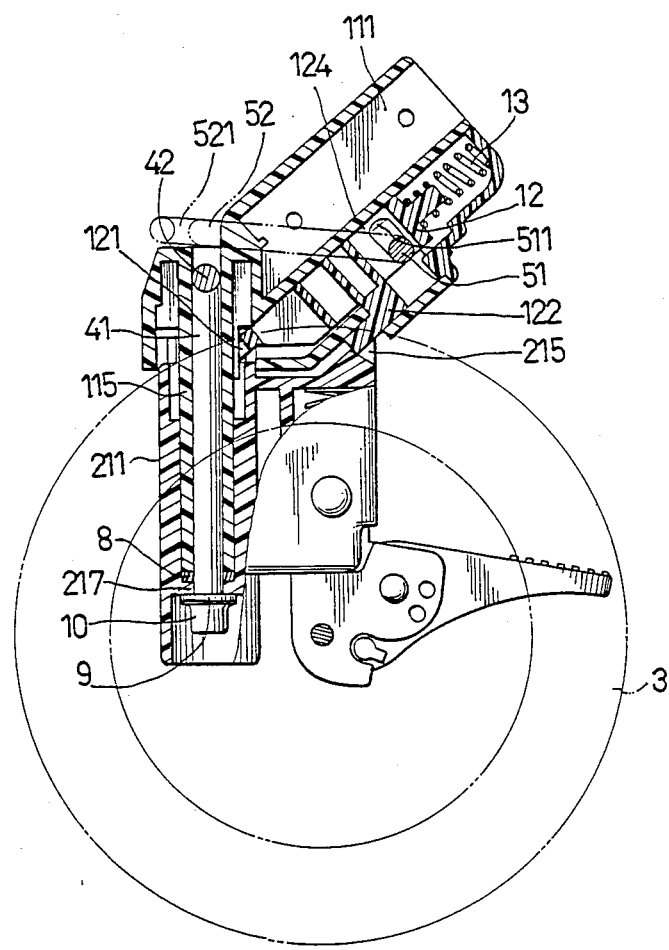
FIG. 5 is a schematic view similar to FIG. 4 except that the control mechanism is in a second position.

Referring to FIG. 5, in the circular sleeve 211 of the lower connector body 21 is further provided an inward flange 217.

In assembly, referring to FIG. 5, an upper washer 8 is firstly placed on the upper surface of the inward flange 217 of the lower connector body 21, the rotating shaft 115 is then inseted into the circular sleeve 211. Subsequently, the longitudinal portion 41 of the connecting rod 4 is inserted into the bore of the hollow rotating shaft 115 and through the central aperture of the inward flange 217 so as to accommmodate a lower washer 9 which is sleeved on the lower end portion of the longitudinal portion 41 of the connecting rod 4. The washer 9 abuts the lower surface of the inward flange 217, thereby permitting a cap 10 sleeve on the lowermost end of the longitudinal portion 41 of the connecting rod 4. After the assembly of the inverted U-shaped connecting rod 4, the upper connector body 11 and the lower connector body 21, the second compression spring 23 is put into the cylindrical recess 221 of the roller support 22, then the rectangular sleeve 214 of the lower connector body 21 houses the longitudinal portion of the roller support so as to connect the roller support by the first rivet 6.

On the other hand, the key member 12 is inserted into the channels 112 and 114 of the upper connector body 11, with the auxiliary engaging limb 122 being received in the lower channel 114. Secondly, the first compression spring 13 is sleeved on the tail 123 of the key member 12, then the cover 14 covers on the right openings of the upper and lower channels 112, 114 of the upper connector body 11 in order for being riveted to the inclined lug 43 to abut on the right end of the first compression spring 13. Finally, the L-shaped free end of the push rod 51 is inserted into the rectangular recess 124 of the key member 12 through the curved notch 113 of the upper connector body 11.

Figure 4:
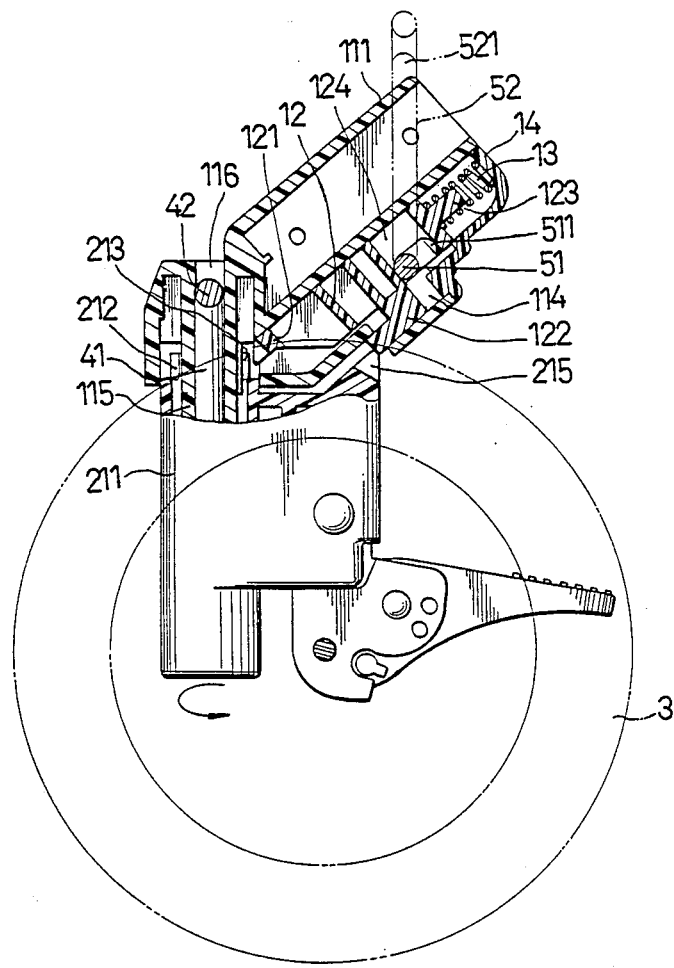
FIG. 4 is a schematic view of the direction setting device of FIG. 1 illustrating a state that a control mechanism is in a first position.

Referring to FIGS. 1, 4 and 5, in use, normally, the control portion 52 of the actuator member 5 is vertical so that the L-shaped free end 511 of the push rod 51 lies on the bottom wall of the upper channel 112 so as to urge the key member 12 against the bias action of the first compression spring 13, thereby moving the main engaging head 121 of the key member 12 away from the contacting surfaces 210 and the main key ways 212, 213, and simultaneously moving the auxiliary engaging limb 122 away from the auxiliary key way 215. This allows the lower connector 2 to rotate relative to the upper connector 1 so that the roller 3 can move in any direction.

When the roller 3 is desired to move unidirectionally, the control portion 52 of the actuator member 5 is rotated to a horizontal position as shown in FIG. 5. In this position, the L-shaped free end 511 of the push rod 51 stands on the bottom wall of the upper channel 112 so that the head 121 of the key member 12 is biased by the first compression spring 13 through the left opening of the upper channel 112 to abut on one of the contacting surfaces 210, subsequently, when the lower connector 2 rotates relative to the upper connector 1, the key member 12 will slip into one of the main key ways 212, 213 to hinder the lower connector 2 from rotation relative to the upper connector 1. Thus, the unidirectional movement of the baby walker used with the device according to the invention is set easily.

With the invention thus explained, it is apparent that various modifications and variations can be made without departing from the scope of the invention. It is therefore intended that the invention be limited as indicated in the appended claims.

What is claimed is:

1. A direction setting devbice for rollers of a baby walker comprising:

a pair of upper connectors, adapted to be connected to a seat of the baby walker, each of said upper connectors including a rotating shaft secured thereon and a spring biased key member mounted on said upper connector;

a pair of lower connectors, respectively adapted to be connected to a front roller of the baby walker, each of said lower connectors including a circular sleeve secured thereon for mounting rotatably said rotating shaft of said corresponding upper connector thereon, said circular sleeve including a circumferential contacting surface for being abutted by said key member, and a key way in said circumferential contacting surface so as to receive said key member of said corresponding upper connector to prevent said lower connector from rotating relative to said upper connector; and a control mechanism for urging said key members against the bias action of said springs to a first position where said key members are spaced from said circumferential contacting surfaces and for releasing said key members to abut on said circumferential contacting surfaces in a second position;

whereby, when said control mechanism is in the first position, said lower connectors can rotate relative to said upper connectors so that said front rollers can move in any direction; and when said control mechanism is in the second position, said key members will slip into said key ways to hinder said lower connectors from rotating relative to said upper connectors so that said front rollers move unidirectionally, and an inverted U-shaped connecting rod, each of said rotating shafts of said upper connectors being hollow for receiving respective one longitudinal portion of said connecting rod to interconnect said upper connectors.

* * * * *